United States Patent [15] 3,659,425
De Geeter [45] May 2, 1972

[54] METHOD AND APPARATUS FOR BURYING PIPELINE

[72] Inventor: Pieter J. De Geeter, Rijswijk, Netherlands
[73] Assignee: Shell Oil Company, New York, N.Y.
[22] Filed: May 25, 1970
[21] Appl. No.: 40,407

[30] Foreign Application Priority Data

May 23, 1969 Great Britain......................26,392/69

[52] U.S. Cl..................................................61/72.4, 37/61
[51] Int. Cl. ..........................................F16l 1/00, E02f 5/02
[58] Field of Search......................61/724, 72, 53.74; 173/49; 37/61, 62

[56] References Cited

UNITED STATES PATENTS

| 3,505,826 | 4/1970 | Harmstorf | 61/72.4 |
| 3,217,499 | 11/1965 | Ishiki | 61/72.4 |
| 3,256,695 | 6/1966 | Bodine, Jr. | 61/72.4 X |

Primary Examiner—Jacob Shapiro
Attorney—J. H. McCarthy and Theodore E. Bieber

[57] ABSTRACT

A pipeline is buried in the bottom of a body of water by fluidizing sediments which compose the bottom adjacent the pipeline so that the pipeline sinks by its own weight into the fluidized sediments.

3 Claims, 3 Drawing Figures

PATENTED MAY 2 1972

3,659,425

INVENTOR:
P. J. DE GEETER

METHOD AND APPARATUS FOR BURYING PIPELINE

BACKGROUND OF THE INVENTION

1. Field of the Invention

The invention relates to a method of burying a pipeline in the bottom of a body of water, for example, in the seabed.

2. Description of the Prior Art

The conventional manner of burying a pipeline in the bottom of a body of water comprises making a trench, laying the pipeline in the trench and allowing the trench to fill up again. This is a rather complicated and expensive method, which has the disadvantage that often the trench fills up again before the pipeline can be sunk into the trench.

SUMMARY OF THE INVENTION

It is an object of the invention to bury a pipeline in the bottom of a body of water, without it being necessary to make a trench, so that the disadvantages thereof are avoided.

For this purpose, the method according to the invention comprises fluidizing by fluid injection the bottom of the body of water adjacent the pipeline by moving a fluidization device along the pipeline, the fluidization device extending over such a minimum length of the pipeline that the latter is buried to the desired depth in one pass, wherein fluid is supplied to the fluidization device, said fluid being passed by the fluidization device to the bottom adjacent the pipeline in such a way as to cause fluidization of the bottom adjacent the pipeline at least over the said length, wherein said length is governed by the formula:

$$l = \sqrt[4]{\frac{CEIZ^1}{q}}, \text{ wherein}$$

$E$ = modulus of elasticity of the pipe material,
$I$ = linear moment of inertia of the pipe,
$q$ = net weight of the pipe (with fluidization device) relative to the fluidized bottom per unit of length of pipe,
$l$ = length of the fluidized bottom adjacent the pipeline,
$Z$ = depth of burying the pipeline,
$C$ = a constant having a value of about 60.

An apparatus for carrying out the method according to the invention comprises a fluidization device adapted to be arranged on a pipeline, means for moving the fluidization device along the pipeline, and means for supplying fluid to the fluidization device. The fluidization device is provided with nozzles for directing fluid jets into the bottom adjacent the pipeline in such a way as to cause fluidization of the bottom adjacent the pipeline. The length of the fluidization device is governed by the formula:

$$l = \sqrt[4]{\frac{CEIZ^1}{q}}, \text{ wherein}$$

$E$ = modulus of elasticity of the pipe material,
$I$ = linear moment of inertia of the pipe,
$q$ = net weight of the pipe (with fluidization device) relative to the fluidized bottom per unit of length of pipe,
$l$ = length of the fluidized bottom under the pipeline,
$Z$ = depth of burying of pipeline,
$C$ = a constant having a value of about 60.

Preferably the fluidization device comprises a number of fluidization units, the fluidization units being interconnected so as to form a train.

DESCRIPTION OF A PREFERRED EMBODIMENT

Figure 1:
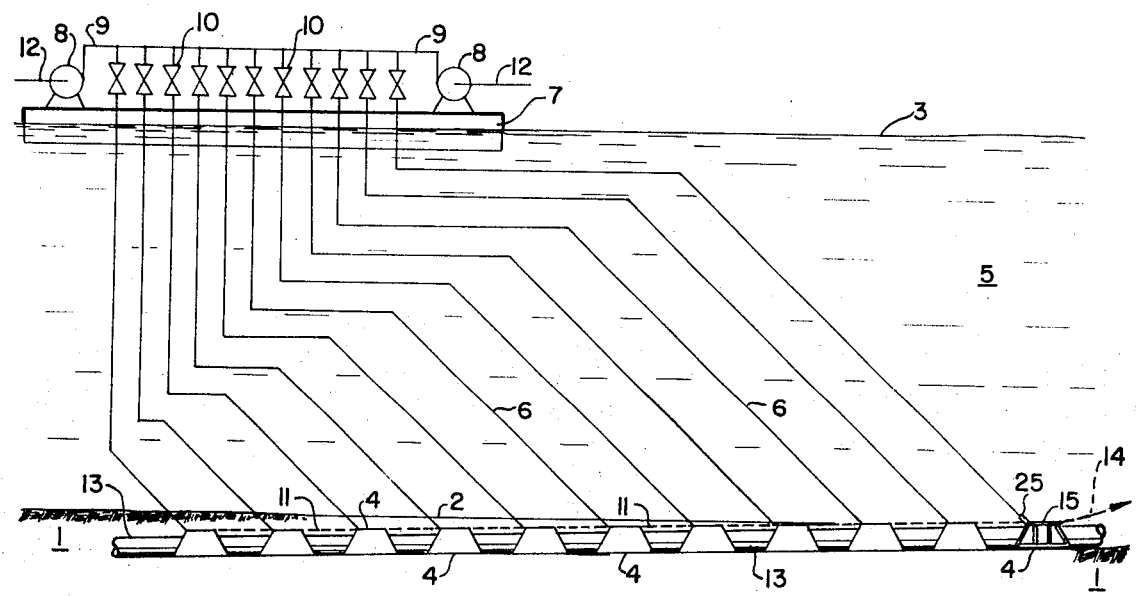
FIG. 1 is a schematic side view partially in outline form of an apparatus for carrying out the method of the invention.

Referring to FIG. 1, we see the floor or bottom 1 of a body of water 5. The bottom 1 may consists of an unconsolidated material such as sand or clay or other sediments. The top surface of the bottom 1 is indicated by the reference number 2 and the surface of the water by the number 3.

Figure 2:
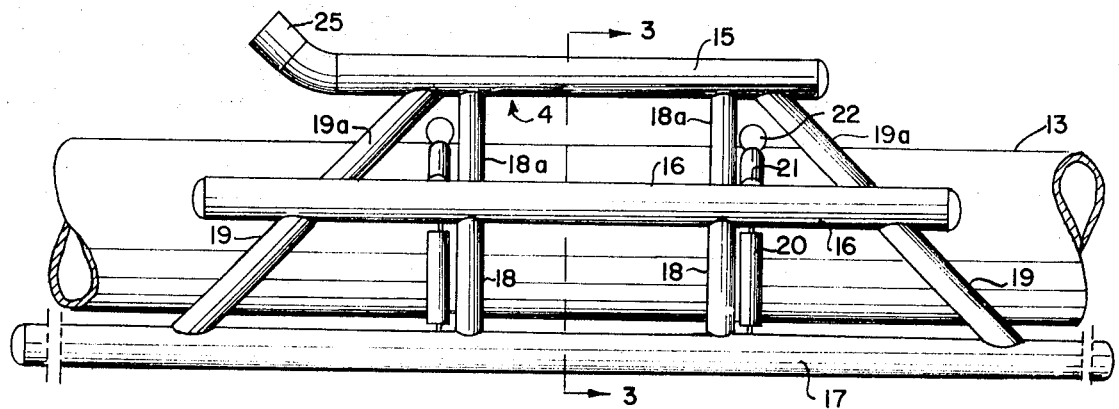
FIG. 2 is a side view of a fluidization unit of the apparatus according to FIG. 1.
Figure 3:
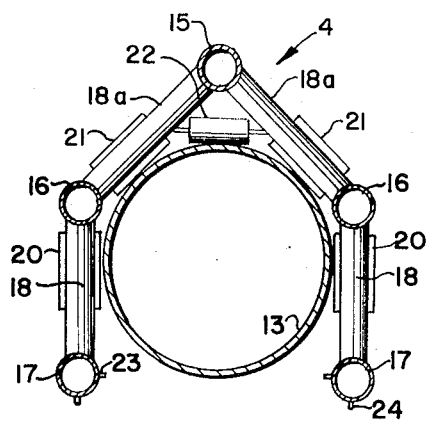
FIG. 3 is a cross section taken along the line 3—3 of the fluidization unit according to FIG. 2.

On a pipeline 13, supported by the bottom 1, are arranged a number of fluidization units 4 (some of which are shown in outline only) which are of a construction as shown in FIGS. 2 and 3. The fluidization unit 4 is substantially Ω-shaped (see FIG. 3) in cross section. It consists of a number of longitudinal parallel metal tubes 15, 16, 17, interconnected by metal tubes such as tubes 18, 18a, 19, and 19a. Between tubes 16 and 17 are arranged rollers 20, between tubes 15 and 16 are arranged rollers 21 and between tubes 18a are arranged rollers 22. Furthermore, one or more extra rollers may be present.

The lowest longitudinal tubes 17 are provided with a large number of nozzles 23 and 24 (see FIG. 3), directed inwardly and/or downwardly. Upwardly directed nozzles may be present as well. The longitudinal tubes 15 are provided with a fluid inlet 25. All the metal tubes 15, 16, 17, 18, 18a, 19, and 19a are interconnected in such a way that fluid can flow from the inlet 25 and through said tubes to the nozzles 23 and 24.

Normally, the metal tubes 18 and 19 are provided as well with nozzles (not shown), directed for fluidization of soil in front of the units to obtain horizontal movement of the units at minimum pulling resistance.

From FIGS. 2 and 3, it will be clear that the fluidization unit 4 can be lowered on the pipeline 13 so that it will surround the pipeline 13, in the way as most clearly shown in FIG. 3. The rollers 20, 21 and 22 permit displacement of the fluidization units 4 along the pipeline 13 as required.

Reverting to FIG. 1, a large number (11) of the fluidization units 4 are put on the pipeline 13. The units 4 are interconnected in a suitable manner with a connecting means, for example, by one long chain or cable 11, or by a number of chains or cables 11 between each pair of units 4. To the foremost unit 4 is secured a cable or chain 14 which is connected to a tugboat (now shown), or any other pulling device such as for example a winch on shore, or a winch on the bottom.

A barge 7 provided with a number of pumps 8 is floating on the water surface 3. The pump suction lines are indicated by the reference number 12 and the pump pressure lines are indicated by the reference number 9. The pressure lines 9 are connected via valves 10 to conduits 6, which are preferably in the shape of hoses. The other ends of the conduits or hoses 6 are each connected to a fluid inlet 25 of a corresponding fluidization unit 4.

The apparatus, as described, is used in the following manner. Assume that a pipeline 13 is laying on the top surface 2 of the bottom 1. Then a tugboat (not shown) draws, via the cable 14, the fluidization units 4 along the pipeline 13. During this displacement fluid, preferably water, is continuously supplied by the pumps 8, through the hoses 6, to the fluidization units 4. This causes water to flow continuously from the nozzles 23 and 24. This water ejecting from these nozzles 23 and 24 causes the soil of the bottom to be fluidized. This means that the bottom material adjacent to (that is under and along the sides of) the pipeline 13 assumes the properties of a liquid, so that the pipeline 13 will sink under the influence of its own weight into said bottom material until it has reached the desired depth.

By means of the method according to the invention, it is possible to cause the pipeline 13 to sink to the desired depth in the bottom 1 by moving the fluidization units 4 along the pipeline 13 once. In other words, the pipeline 13 can be buried in one pass, at the desired depth in bottom 1.

In order to obtain the required burying depth of the pipeline in one pass and not to overstrain the pipeline 13, it is, however, necessary to fluidize the bottom material over a sufficient length of the pipeline. This means that a fluidization device of sufficient length or a sufficiently large number of fluidization units 4 has to be used, in order to be able to cover said length. The minimum required length of the fluidization device can be calculated from the formula:

$$1 = \sqrt[4]{\frac{CEIZ^1}{q}}, \text{ wherein}$$

$E$ = modulus of elasticity of the pipe material,
$I$ = linear moment of inertia of the pipe,
$q$ = net weight of the pipe (with fluidization device) relative to the fluidized bottom per unit of length of pipe,
$l$ = length of the fluidized bottom under the pipeline,
$Z$ = depth of burying the pipeline,
$C$ = a constant having a value of about 60.

Each fluidization unit 4 has its own supply of fluid in order to be able to control the degree of fluidization per unit. In FIG. 1 each unit 4 is shown as having its own conduit 6. Of course, it is possible to have, instead, only one conduit supplying fluid to all the fluidization units 4. In that case, a suitable system of valves (not shown) will be needed to maintain the possibility of independent control of each unit 4.

By way of illustration, the following example is given of a steel pipeline of 36-inch diameter with concrete coating having a linear moment of inertia of $I = 400,000$ cm$^4$ and being made of such a material that the modulus of elasticity is $E = 2.1 \times 10^7$ N/cm$^2$.

It is desired to bury this pipeline to a depth $Z = 300$ cm in a seabed.

$q$ = volume $x\rho_{net}$ + weight of fluidization units/m
$q$ = 660 dm$^3$ ($\rho$ pipe $- \rho$bed) + weight of fluidization units/m
= 660 (1.4 − 1.4) + 16,000 N/8m = 2,000 N/m
= 20 N/cm ($N$ is about 0.1 kgf)

By substituting the above data in the formula $$1 = \sqrt[4]{\frac{CEIZ^1}{q}},$$

wherein $C$ has the value of 60, it is found that for this particular case $l = 93$ meters.

In FIG. 1 a barge 7 is shown carrying pumps 8. Instead it is possible to mount on each unit 4 a pump (not shown). Such a pump could suck in water from around the pipeline 13 and press it via inlet 25 to the nozzles 23 and 24. In such an embodiment, the pumps 8 and conduits 6 could be omitted.

Furthermore, in FIG. 1, the train of fluidization units 4 is drawn along the pipeline 13 by means of a tugboat and the cable 14. Of course, it would be possible to use a barge with winches instead of a tugboat. Instead it would be possible to put a kind of a locomotive (not shown) on the pipeline 13 adapted to draw the train of units 4 along the pipeline 13. Such a locomotive could, for example, be provided with a suitable electric motor and could be controlled through an electric power cable from a ship. The fluid to be used is preferably water. Instead it is, however, possible to use a mixture of air and water, if desired.

If desired, sonar equipment can be used to determine, during the burying operation, the level of each fluidization unit relative to the pipeline also in case a fluidization unit is fully sunk into the bottom. Use of such sonar equipment makes it also possible to control the degree of fluidization under each fluidization unit in dependence of the data produced by the sonar equipment. In other words, if the sonar equipment indicates that one or more of the fluidization units are not sufficiently deep below the top surface of the bottom then extra fluid can be supplied to the said fluidization units until the desired depth is reached.

The fluidization device may consist of a single unit of a minimum length, governed by the formula as mentioned above. Instead a train of interconnected fluidization units as described may be used having a total length as governed by the formula as mentioned above.

The fluidization device should be of such a weight that its weight per unit of length is sufficient to render the local specific gravity of the pipeline sufficient together with that of the fluidization device to guarantee descent of the pipeline in the fluidized bottom material.

In the embodiment of the method of the invention as described, the pipeline is first laid on the bottom of the body of water, whereafter the fluidization device is moved along the pipeline to bury it. Instead, it is possible to move the fluidization device along the pipeline during the laying operation of the pipeline, so that the pipeline is immediately buried into the bottom during the laying operation.

In order to prevent tilting of the fluidization units, each fluidization unit should be dimensioned in such a way that, during normal use (that is in the position as shown in FIG. 3), the center of gravity of the unit is laying below the center of the pipeline.

In summary, this invention provides a method and apparatus for burying a pipeline in an unconsolidated material which forms a floor underlying a body of water. The method comprises the steps of: laying at least a portion of the pipeline upon the floor underlying said body of water, providing adjacent at least one selected interval of the portion of the pipeline lying upon the floor an apparatus capable of fluidizing at least some of the unconsolidated material by jetting a fluid into the unconsolidated material, and jetting a fluid into the unconsolidated material adjacent the selected interval of the portion of the pipeline lying upon the floor whereby the unconsolidated material is fluidized adjacent the selected interval of the pipeline sinks into the fluidized unconsolidated material. In a preferred embodiment of the method, the apparatus may be moved along the pipeline while jetting the fluid.

One embodiment of an apparatus which may be used in the practice of this invention comprises a fluidization devide adapted to be axially movably arranged on a pipeline, nozzle means operatively connected to fluidization device for directing a jet of a fluid into unconsolidated material adjacent the pipeline, means such as hoses or other conduits, for supplying fluid to the nozzles, and means for moving the fluidization device along the pipeline. The fluidization device may comprise a plurality of hollow steel tubes joined together so as to form an elongate, open-framework structure which in cross section describes a geometric figure having a partially open periphery whereby the structure may be fitted over a pipeline.

I claim as my invention:

1. In a method for burying a pipeline a selected depth in an unconsolidated material which forms a floor underlying a body of water of the type comprising the steps of laying at least a portion of said pipeline upon said floor underlying said body of water; providing adjacent at least one selected interval of said portion of said pipeline lying upon said floor an apparatus capable of fluidizing at least some of said unconsolidated material by jetting a fluid into said unconsolidated material; and jetting a fluid into said unconsolidated material adjacent said selected interval of said portion of said pipeline lying upon said floor whereby said unconsolidated material is fluidized adjacent said selected interval of said pipeline and whereby at least some of said pipeline sinks into said fluidized unconsolidated material; the improvement which comprises the steps of:

determining a length of said selected interval of said pipeline adjacent which fluid is injected that is sufficient to allow said pipe to sink to said selected depth without overstraining said pipe; and jetting said fluid adjacent a selected interval of said pipeline having a length at least great as said above determined length.

2. The method of claim 1 including the step of moving said apparatus along said pipeline while jetting said fluid to fluidize said unconsolidated material.

3. The method of claim 1 wherein said determined length of said selected interval of said pipeline adjacent which fluid is injected is at least as great as a length, $l$, given by the formula:

$$1 = \sqrt[4]{\frac{CEIZ^1}{q}}, \text{ wherein}$$

$E$ = modulus of elasticity of the pipeline material,
$I$ = linear moment of inertia of the pipeline,
$q$ = net weight of the pipeline relative to the weight of the unconsolidated material fluidized per unit of length of pipeline,
$Z$ = depth of burying the pipeline,
$C$ = a constant having a value of about 60.

* * * * *